United States Patent [19]
Cullen

[11] 3,939,648

[45] Feb. 24, 1976

[54] MULTI-PITCH TOOL BAR FOR TRACK PRESSES

[75] Inventor: Laurie J. Cullen, Burlingame, Calif.

[73] Assignee: Wolff Manufacturing Company, Burlingame, Calif.

[22] Filed: Dec. 6, 1974

[21] Appl. No.: 530,371

[52] U.S. Cl. .................................................. 59/11
[51] Int. Cl.² ........................................ B21L 21/00
[58] Field of Search............ 59/11, 7, 1, 5, 6, 8, 10, 59/35, 12; 72/447, 462, 413, 478, 481

[56] References Cited
UNITED STATES PATENTS

| | | |
|---|---|---|
| 3,028,723 | 4/1962 | Kaplan ..................................... 59/7 |
| 3,075,346 | 1/1963 | Quarve ..................................... 59/7 |
| 3,097,477 | 7/1963 | Rodgers ................................... 59/7 |
| 3,099,130 | 7/1963 | Pahl ......................................... 59/11 |

*Primary Examiner*—C. W. Lanham
*Assistant Examiner*—Gene P. Crosby
*Attorney, Agent, or Firm*—Flehr, Hohbach, Test, Albritton & Herbert

[57] ABSTRACT

A multi-pitch tool bar for receiving bushing and pin tools used in track presses employed in the assembly and disassembly of drive chains for the ground engaging shoes of track laying tractors.

4 Claims, 6 Drawing Figures

MULTI-PITCH TOOL BAR FOR TRACK PRESSES

BACKGROUND OF THE INVENTION

This invention relates generally to tool bars for use in track presses and more particularly to multi-pitch tool bars for receiving bushing and pin tools to engage pins and bushings of drive chains having different pitch and size.

Crawler or track laying tractors are widely used particularly for heavy duty work. The tracks employed in such tractors include ground engaging shoes or grousers removably secured to a drive chain driven over an idler sprocket by means of a driven sprocket. The drive chain includes a plurality of sections each adapted to receive a shoe. Each section includes a pair of side links spaced apart to receive the sprocket wheel teeth. Each section is pivotally joined to the next adjacent section by means of a cross pin and bushings. The side links of each section are relatively widely spaced at one end to receive the relatively closely spaced ends of the next side link. Bushings are press fit into the closely spaced ends while pins are press fit into the widely spaced ends of each pair to form the pivotable joint between sections.

Because of the nature and operation of tractors, the tracks are subjected to rapid wear and require frequent repair. Generally, for repair, the track is removed from the tractor by removal of a master pin and the track is laid out. In larger tracks the shoes or grousers are removed to expose the drive chain. In smaller tracks, they are not removed. In either case, the chain is then mounted on a track press and moved to present the links in succession to a work station which includes a jaw for holding spaced adjacent bushings of the chain in position as hydraulic rams move spaced pin and bushing tools mounted on a tool bar into cooperative relationship with the pins and bushings to remove the pins and bushings from the links to release the side links for disassembly. During disassembly, the chain is moved in the opposite direction and the pins and bushings are inserted by spaced pin and bushing tools.

The track press generally includes hydraulically driven tools on each side of the chain whereby to engage and remove or insert the pins and bushings from each side of the links in succession. The links are restrained from side movement by a jaw which includes spaced U-shaped grooves for receiving the bushings and orienting each section in a position whereby the advancing tools register with the pins and bushings. The jaw may be a retractable jaw which is retracted to advance the chain one section at a time to present the next section to the station or may be a fixed jaw where the chain is moved upwardly, advanced and then lowered to place the bushings in engagement with the jaw grooves. A typical track press with retractable jaws is described in U.S Pat. No. 3,075,346.

There are many models and sizes of track laying tractors manufactured by each of a number of manufacturers. The track size differs for different models, sizes and manufacturers. As a result, different sizes and pitch of pin and bushings tools are required to provide the proper pitch and size to engage the pins and bushings for the variety of tracks encountered. Different heights of the tool centerline are also required. Present day tool bars do not provide a large choice of pitches and sizes. In U.S. Pat. No. 3,075,346, there is shown and described a slotted tool bar which provides for adjustable pitch. However, the operator must carefully position the pin and bushing tools to assure proper pitch and position with regard to the associated chain. Tool bars are also available having spaced pairs of tool mounting holes disposed on a single centerline. A different tool bar is required for different size chains since the height centerline of the pins and bushings will be dependent thereon.

OBJECTS AND SUMMARY OF THE INVENTION

It is a general object of the present invention to provide a tool bar which can be used for a large number of different chain sizes, types and pitches.

It is another object of the present invention to provide a tool bar which can be readily positioned at different predetermined heights.

It is a further object of the present invention to provide a tool bar including a plurality of prepositioned tapped holes for receiving the pin and bushing tool holding screw.

The foregoing and other objects of the invention are achieved by a tool bar which includes means for mounting the bar at different centerline heights and a plurality of spaced pairs of pin and bushing tool mounting holes providing a plurality of predetermined pitches with respect to each of said centerline heights.

DESCRIPTION OF PREFERRED EMBODIMENTS

Figure 1:
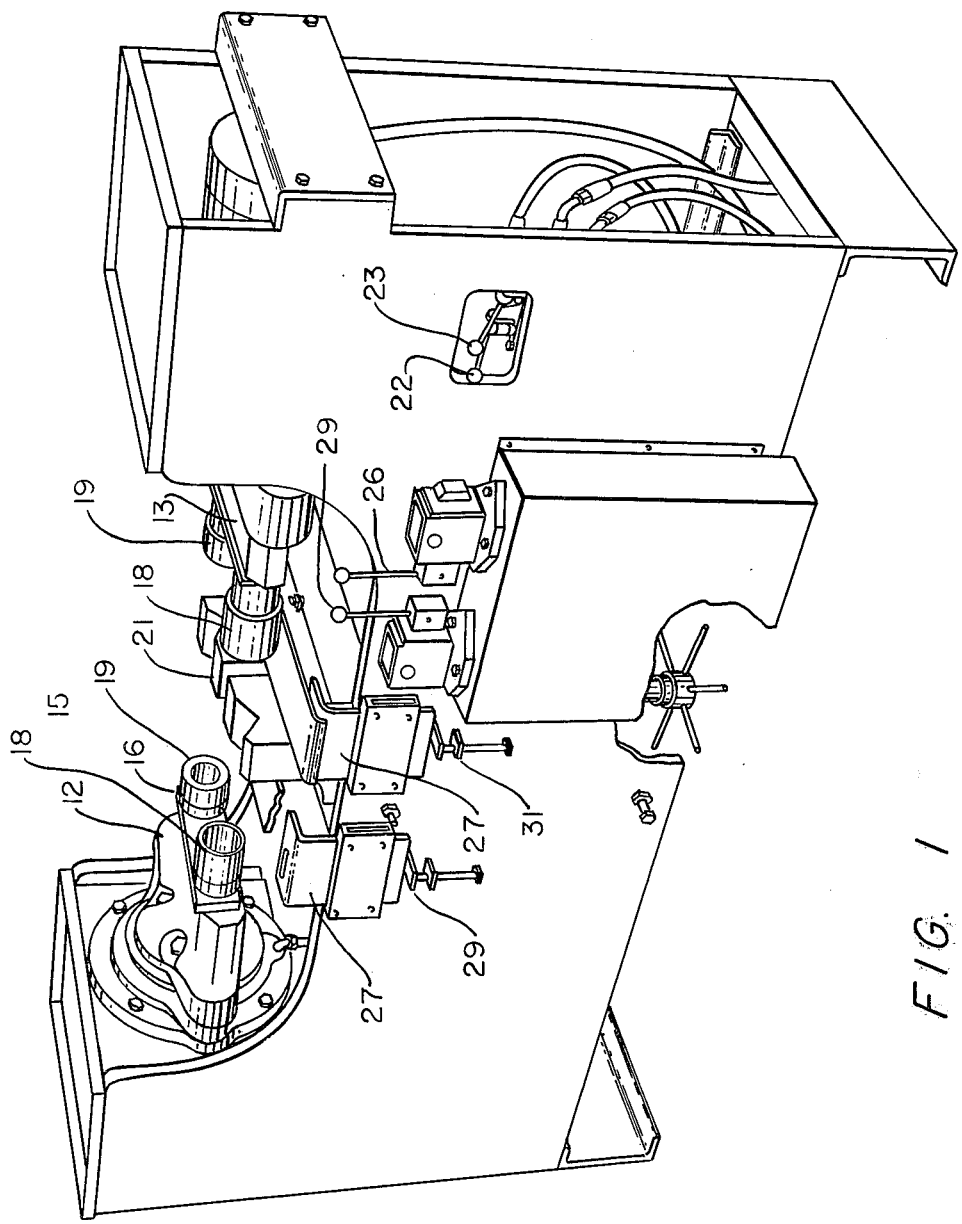
FIG. 1 is a perspective view showing a track press incorporating a tool bar in accordance with the present invention.

Referring to FIG. 1, there is shown a track press including hydraulically driven tool heads 12 and 13 adapted to accommodate tool bars 16 with associated tools 18 and 19. The tool heads 12 and 13 are advanced to bring the tools 18 and 19 into engagement with the bushing and the pin of the associated chain to thereby remove or insert the bushings and pins.

Suitable control 22 is provided for retracting the jaw. Control 23 is provided for hydraulically advancing the drive chain. Controls 24 and 26 control the left and right-hand rams for advancing and retracting the tool heads to remove and insert the bushings and pins. Work tables 27 and 28 accommodate the release links and are adjustable by means of adjusting screws 29 and 31, respectively.

Figure 2:
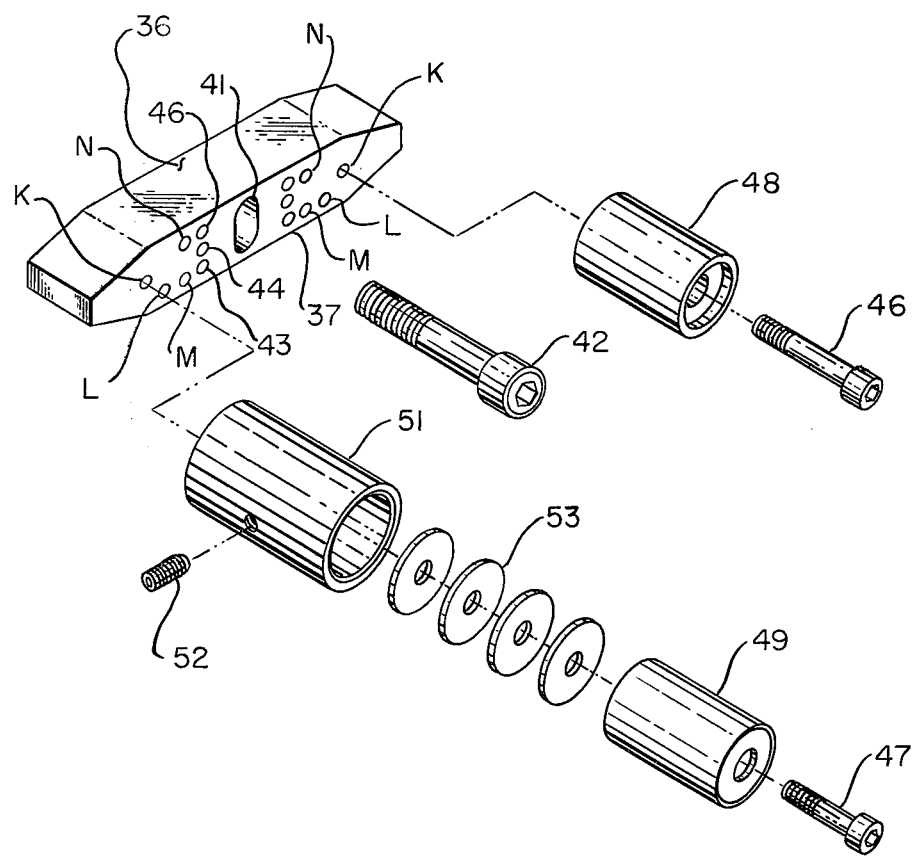
FIG. 2 is an exploded perspective view of a tool bar with associated pin and bushing tools and tool mounting means.

The multi-pitch tool bar 16 is more clearly shown in FIG. 2. The bar has an elongated rectangular configuration having parallel sides 36 and 37 with parallel front and rear faces 38 and 39. The bar is provided with mounting means in the form of an elongated through hole 41 adapted to receive bolt 42 threadably received by the tool head to secure the bar to the tool head. The elongated hole 41 permits the bar to be positioned at selectable heights. In the example shown, the bar is adapted to be mounted at three heights. Spaced locating pins (not shown) engage one of the three pairs of locating pin receiving holes 43, 44, 46 to position and hold the bar on the tool head. The bar is, of course, securely held against the tool head and in engagement with the pins by means of the bolt 42.

Figure 3:
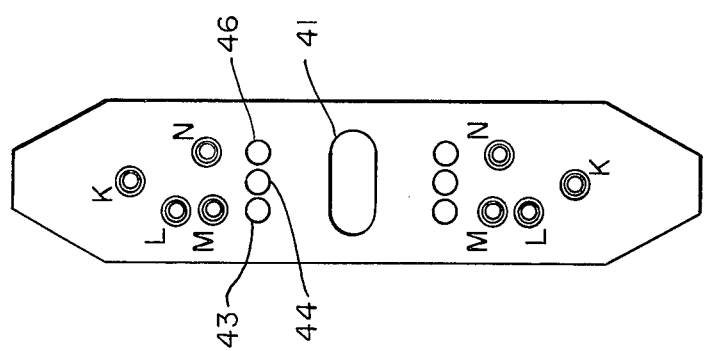
FIG. 3 is a plan view of one side of a tool bar in accordance with the present invention.

In accordance with the present invention, there is provided a plurality of pairs of tapped holes such as the pairs KK, LL, MM and NN, FIGS. 2 and 3. Each of the pairs of holes is adapted to receive bolts 46 and 47 which are threadably received by the tapped holes to mount the pin tool 48 and bushing insert 49 on the bar. The bushing sleeve 51 fits over the bushing insert and is secured thereto by means of a set screw 52. The extension of the bushing insert can be adjusted by means of spacers 53 whereby the end of the bushing sleeve can extend outwardly beyond the bushing insert to define a rim for engaging the associated chain bushing. It is to be noted that the centerline through the tapped holes NN is also the centerline of one pair of positioning holes 46; the centerline of the tapped holes MM and LL is the same as that for the positioning holes 43; and the centerline of tapped holes KK is the same as that for the positioning holes 44. It is further observed that the centerlines are vertically spaced and parallel to one another. By loosening the bolt 42 and vertically positioning and fixing the bar to the tool head, it is possible to accommodate chain pins and bushings having different diameters and heights. It is, therefore, seen that with one face of a single tool it is possible to accommodate four different pitches and three different heights.

Figure 4:
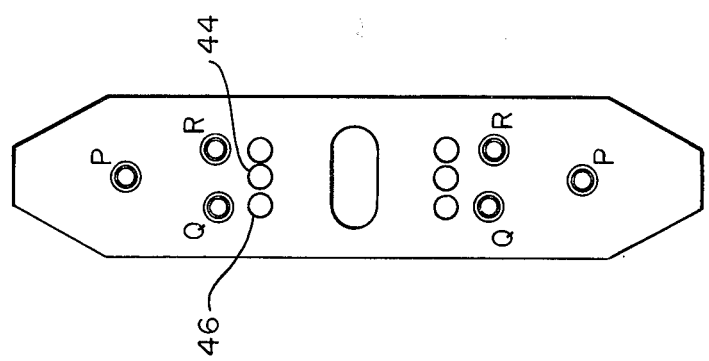
FIG. 4 is a plan view of the other side of the tool bar shown in FIG. 3.
Figure 5:
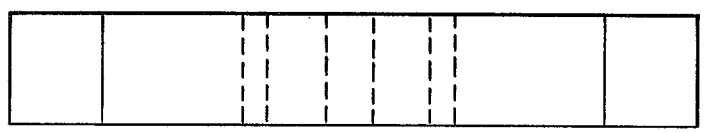
FIG. 5 is a side elevational view of the tool bar of FIGS. 3 and 4.

Referring to FIG. 4, the opposite face of the tool bar is provided with pairs of tapped holes PP, QQ and RR lying on different centerlines. Thus, the single tool bar shown in FIGS. 2–5 provides seven different pitches and three different heights giving a large combination of possible tracks for which the single tool bar can be used.

Figure 6:
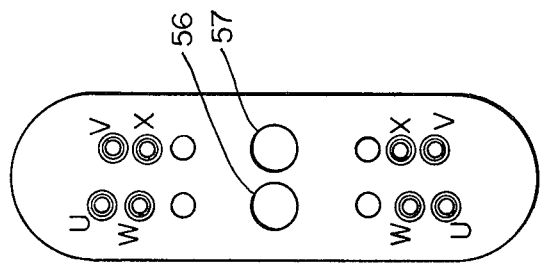
FIG. 6 is a plan view of another tool bar in accordance with the present invention.

FIG. 6 illustrates a tool bar which provides for positioning at two different heights by means of mounting holes 56 and 57. As shown, the bar includes four different tool pitch mountings UU, VV, XX and WW. It is understood that the opposite face of the bar may also be provided with tapped holes to provide additional pitches.

Thus, it is seen that a single tool bar can be used to adapt to a wide variety of track pitches, heights and types thereby economizing in the amount of material used for tool bars and also in the inventory of bars required.

I claim:

1. For use in a track press of the type adapted to receive a track chain having pins and bushings and present the chain to a movable tool head for removing or inserting the pins and bushings during disassembly or assembly, a multi-pitch tool bar adapted to be mounted on said head for receiving pin and bushing tool holding bolts whereby the pin and bushing tools are positioned to engage the chain pins and bushings, said bar including means for receiving a tool bar mounting bolt for securing the bar to the tool head at at least two heights, a plurality of pairs of spaced threaded holes for receiving the pin and bushing tool holding bolts formed in said tool bar, each pair of spaced threaded holes having a centerline, and at least two pairs of threaded holes disposed on different parallel spaced centerlines whereby the height of the tools as well as the pitch can be selected.

2. A multi-pitch tool bar as in claim 1 in which said means for mounting the tool bar to the tool head at at least two heights comprise an elongated slot adapted to receive said mounting bolt and at least two pairs of locating pin receiving holes on said parallel spaced centerlines.

3. A multi-pitch tool bar as in claim 1 in which said means for mounting the tool bar to the tool head at at least two heights comprises at least two holes at said parallel centerlines for receiving said mounting bolt and a pair of locating pin receiving holes associated with each of said holes also on said parallel centerlines.

4. A multi-pitch tool bar as in claim 1 in which the tool bar includes spaced parallel faces and pairs of threaded holes for receiving the tool holding bolts are disposed on each face of said tool bar.

* * * * *